United States Patent [19]

Fang

[11] 3,914,856

[45] Oct. 28, 1975

[54] ECONOMICAL SOLAR CELL FOR PRODUCING ELECTRICITY

[76] Inventor: Pao-Hsien Fang, 156 Common St., Belmont, Mass. 02178

[22] Filed: June 5, 1972

[21] Appl. No.: 259,796

[52] U.S. Cl. .................. 29/572; 29/589; 136/89; 148/174
[51] Int. Cl. .............................. B01j 17/00
[58] Field of Search ............ 29/572, 576 S, 589; 148/174

[56] References Cited
UNITED STATES PATENTS

| | | |
|---|---|---|
| 3,151,379 | 10/1964 | Escoffery ........................ 29/572 |
| 3,317,287 | 5/1967 | Caracciolo ....................... 29/576 S |
| 3,483,038 | 12/1969 | Hui ................................. 29/572 |
| 3,689,991 | 9/1972 | Aird ................................ 29/576 S |

*Primary Examiner*—W. Tupman
*Attorney, Agent, or Firm*—Richard J. Birch, Esq.

[57] ABSTRACT

This invention relates to a method for economically and rapidly producing solar cells, made of either silicon or of germanium. Complete solar cells are deposited in a carrier substrate by processes geared to large scale production at high production rates not obtainable from the present state of art.

4 Claims, No Drawings

ECONOMICAL SOLAR CELL FOR PRODUCING ELECTRICITY

This invention relates to a device, commonly known as a solar cell, for converting solar energy to electrical energy by photovoltaic process. More particularly, this invention discloses a method to produce such a device in large volume quickly to meet the demands of physical and economical practicality. The ever-increasing demand for electric power, and the social and the ecological cost of the current method of electrical power production are grave concerns. One cost-free and practically unlimited means for millions of years to come is to derive the electric power from solar energy. Indeed, solar energy also could be utilized to produce other forms of energy, for example, solar heating. But our invention is related to a specific one: in our technological civilization, electric power performs some unique functions which cannot be replaced by other forms of power.

At present there are many other attempts to produce electricity, such as nuclear reactions and confined plasma. However, there is a concern over the possibility and the extent of radiation and thermal hazzards. In the same domain of utilizing solar energy to produce electricity, there are other approaches, for example, to absorb the solar energy by a blackbody so the thermal energy produced replaces the conventional fuels; however, the conventional generator is retained. Consequently, a centralization of power plants is required.

In the approach of this invention, the energy collector and the power generator are in the same body and there is no necessity of centralization; thus a costly and objectionable power transmission cable problem could be minimized.

This invention utilizes silicon or germanium solar cells which have been rapidly developed and applied in space satellites. But a direct use of the present-day solar cell design for a large scale power requirement, in particular for a terrestrial power application, would lead to an enormous cost with astronomical numbers of labor hours. To ameliorate this situation is the fundamental point of this invention.

The solar energy flux in space is $0.14$ w/cm$^2$. On the ground, there is much variation due to the earth's rotation, the atmospheric absorption, and weather conditions. On a clear day at noon, this value is about $0.10$ w/cm$^2$. The efficiency of current silicon solar cells to convert solar energy into electrical energy is from 8 to 13%. For an efficiency value of 10%, therefore, on the ground solar cells can produce $1.0 \times 10^{-2}$ w/cm$^2$, or equivalently, 260 megawatts/mile$^2$. The present-day cost of solar cells is about $1/cm$^2$. That will be 20 billion dollars per square mile.

The present configuration of solar cells has practically no adaptability to automation and the rate is about 0.1 man-hour/cm$^2$, that is, $1.25 \times 10^6$ man-year/mile$^2$.

Therefore, with the present state of art for a city with a 1000 megawatts electrical power requirement: solar cell area, 12 mile$^2$; solar cell cost, $2.8 \times 10^{10}$; production time, $1.5 \times 10^7$ worker man-year. The solar cell area which will cover the earth is huge, but can be located on waste land, stripped mine area or rooftops. The most intolerable figures are the cost and the production time. The purpose of this invention is to develop a method to reduce the cost and the worker man-year by orders of magnitude, so that solar cells in the size of many square miles could be produced in a reasonable time with an acceptable amount of manpower.

The basic principle of this invention is explained in the following. For the sake of clarity, the silicon solar cell alone is described, but, with some trivial modifications, an implication to the germanium solar cell is self-evident.

A. Present-day solar cells are made of single crystals. The crystal cost alone is about $10/watt. Now, the basic configuration of silicon solar cells is a one-dimensional flow of electrons and holes (minority carriers) perpendicular to the surface. Therefore, instead of a single crystal, one can as well use polycrystals, as long as the dimension of the crystal is about the thickness of the solar cell.

B. Referring to the present-day solar cell as the ordinary solar cell and the solar cell given by this invention as the new solar cell, the thickness of the ordinary solar cell is about 300 microns and that of the new solar cell about $10\mu$. One basic parameter to determine the energy conversion efficiency is the optical absorption through the crystal of the useful wavelength; that is, waves shorter than those of the band gap wavelength. Numerically, 80% of the available solar energy is absorbed in silicon of $10\mu$ thick. Therefore, the new solar cell would be about 20% lower in efficiency than the ordinary solar cell. However, the cost of the silicon material would be reduced by 30 times. Furthermore, when the crystal thickness is less than $100\mu$, the efficiency becomes practically independent of the lifetime of the minority carrier. Therefore, the crystal imperfection, the mechanical damage and the impurity contamination, all of which result in the shortening of the lifetime and therefore require great caution in the ordinary solar cell technology, are not problematical in the new solar cell.

C. With the above considerations (A) and (B), it is permissible to design a flexible solar cell configuration which can be adapted to a conveyer belt production assembly. A basic component of the system is a carrier substrate to support the fragile layer of silicon film. There are two stringent requirements for this carrier substrate: (i) a matching of the thermal expansion coefficient with that of silicon, and (ii) economy in cost. This invention adapts the use of a nickel-iron alloy commonly referred to as a glass sealing alloy with the following major composition—42% nickel and 58% iron. An alternative substrate is polyimide with a trade name Kapton (DuPont product.) This material is more stable, but the thermal expansion match is poor, and the cost is considerably more.

Now the basic steps and configurations to produce the new solar cell will be outlined in a format of eight adjacent stations:

1. Start with a roll of flexible substrate which is unrolled with a conveyer belt arrangement and fed into station (i) where on the substrate will be evaporated a layer of silver and, on top, a layer of titanium, or by a single aluminium layer to form an electrode with an atomic contact to silicon to be deposited.

2. Continue on to station (ii), a silicon evaporator source with proper impurity (either n or p type) and concentration. This source will have one of the following forms: (i) a chemical solution as used in the epitaxial evaporation, (ii) a solid for electron beam evaporation, or (iii) an electrode plate for ion sputtering. In this station, a silicon layer in the thickness of about 10 microns is grown.

3. Next, the silicon film with the substrate will be fed in a continuous fashion from station (ii), through (iii) into (iv), where either a high voltage ion accelerator will implant, or a thermal process will diffuse, ions of opposite type of impurity from that of original silicon, so that a p-n junction would be formed.

4. At the end of steps (3) and (4), temperature stations (iii) and (v) should be inserted to perform annealing. The temperature of these stations will be kept at about 500°C and annealing time will be about 10 minutes.

5. Station (vi) is to evaporate grid lines as in the ordinary solar cell for the front electrodes.

6. Station (vii) is to perform a thermal compression binding or an electrode forming process to attach electrical lead wires.

7. Station (viii) is $SiO_x$ or another type of coating which performs dual purposes: anti-reflection coating and a protection of grid from environmental corrosion.

8. In addition, one can spray on a layer of plastic coating such as clean teflon. This is a supplement to $SiO_x$ for protection on the front and back of the cell, if this is necessary.

9. The continuous roll of substrate fed in station (i) will come out of station (viii) as a roll of completed solar cell sheets. These sheets have intermediate connection leads which could be designed for either a series or a parallel connection to produce the desired voltage and current.

These steps are by no means exclusive nor inclusive. Some steps could be combined or eliminated. For example, one might find that the thermal annealing steps could be combined into a single step. On the other hand, several additional steps could be considered:

i. Introducing a silicon oxide layer to the substrate before the metallic electrode evaporation. This oxide layer serves three purposes: (i) as an electrical insulation from the substrate, (ii) to reduce the diffusion between the substrate material and the semiconductor layer, and (iii) as a better matched substrate for growing silicon films.

ii. When the titanium-silver alloy is used as a base electrode, if sufficiently high temperature is applied, titanium could act as a getting agent to remove the harmful impurities from the semiconductor layer.

In resume, the system consists of a large deposition and annealing system with locking facility between different stations to prevent contamination. The external contamination and mechanical strain and stress is kept to a minimum because the product, until completed, will not be exposed to an environment outside of the closed system.

What is claimed is as follows:

1. A method for producing a solar cell device having silicon solar cells supported by an electrically conductive, aluminum substrate, said method comprising the steps of depositing and growing a thin layer of crystalline silicon of specific impurity type and concentration on the aluminum substrate using the aluminum as the nucleation site for growth of the silicon crystals and for auto-doping of the silicon, forming p-n junctions to enable the device to perform photovoltaic energy conversion, and securing front electrodes and connection leads to the device.

2. The method of claim 1 to improve the efficiency of silicon solar cells by carrying out a thermal annealing step between the first and second steps.

3. The method of claim 1 wherein said thin layer of crystalline silicon has a thickness of approximately 10 microns.

4. The method of claim 1 further comprising the step of coating an anti-reflection and anti-corrosion agent thereon.

* * * * *